(12) United States Patent
Nakagawa et al.

(10) Patent No.: US 10,948,802 B2
(45) Date of Patent: Mar. 16, 2021

(54) WAVELENGTH CONVERTER APPARATUS AND METHOD OF PERFORMING WAVELENGTH CONVERSION

(71) Applicant: FUJITSU LIMITED, Kawasaki (JP)

(72) Inventors: Goji Nakagawa, Sagamihara (JP); Tomoyuki Kato, Yokohama (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/742,254

(22) Filed: Jan. 14, 2020

(65) Prior Publication Data
US 2020/0241384 A1 Jul. 30, 2020

(30) Foreign Application Priority Data
Jan. 28, 2019 (JP) .............................. JP2019-012386

(51) Int. Cl.
*G02F 2/00* (2006.01)
*G02F 1/35* (2006.01)
(Continued)

(52) U.S. Cl.
CPC ............ *G02F 2/004* (2013.01); *G02F 1/3536* (2013.01); *G02F 2002/006* (2013.01);
(Continued)

(58) Field of Classification Search
CPC .. G02F 1/3536; G02F 2/004; G02F 2002/006; H04B 10/505; H04B 10/506; H04B 10/572; H04J 14/02
See application file for complete search history.

(56) References Cited

U.S. PATENT DOCUMENTS 5,386,314 A * 1/1995 Jopson ................. G02F 1/3536
359/326
6,509,987 B1 * 1/2003 Hunziker ............. H04B 10/291
398/157
(Continued)

FOREIGN PATENT DOCUMENTS

EP 1306718 A1 5/2003
GB 2319682 5/1998
(Continued)

OTHER PUBLICATIONS

EESR—The Extended European Search Report of European Patent Application No. 20150475.0 dated Aug. 3, 2020.

*Primary Examiner* — Daniel Petkovsek
(74) *Attorney, Agent, or Firm* — Fujitsu Patent Center

(57) ABSTRACT

A wavelength converter includes a first phase modulator configured to perform phase modulation on pump light in accordance with a first phase modulation signal, a second phase modulator configured to perform phase modulation on signal light in accordance with a second phase modulation signal, a wavelength converter configured to multiplex the signal light having undergone the phase modulation with the pump light having undergone the phase modulation, the wavelength converter configured to perform wavelength conversion on the signal light in accordance with the pump light, a detector configured to detect a modulation component from the signal light having undergone the phase modulation and the pump light having undergone the phase modulation, and a generator configured to generate the first phase modulation signal and the second phase modulation signal so as to minimize the detected modulation component.

9 Claims, 13 Drawing Sheets

(51) Int. Cl.
  *H04B 10/50*   (2013.01)
  *H04J 14/02*   (2006.01)
  *H04B 10/548*  (2013.01)

(52) U.S. Cl.
  CPC .......... *H04B 10/505* (2013.01); *H04B 10/548* (2013.01); *H04J 14/02* (2013.01)

(56) References Cited

U.S. PATENT DOCUMENTS

| | | | | |
|---|---|---|---|---|
| 6,879,433 | B1* | 4/2005 | Yamashita | G02F 1/3536 |
| | | | | 359/326 |
| 7,092,146 | B2* | 8/2006 | Kim | G02F 2/004 |
| | | | | 359/326 |
| 7,253,943 | B2* | 8/2007 | Kim | G02F 1/0123 |
| | | | | 359/326 |
| 8,488,978 | B2* | 7/2013 | Watanabe | G02F 1/3515 |
| | | | | 398/183 |
| 9,935,712 | B2* | 4/2018 | Aflatouni | H03K 3/42 |
| 10,429,721 | B2* | 10/2019 | Kato | G02B 6/272 |
| 2008/0063346 | A1* | 3/2008 | Nakanishi | G02B 6/02028 |
| | | | | 385/123 |
| 2009/0279891 | A1* | 11/2009 | Yu | H04J 14/06 |
| | | | | 398/65 |

FOREIGN PATENT DOCUMENTS

| | | |
|---|---|---|
| JP | 10-221656 | 8/1998 |
| JP | 11-225109 | 8/1999 |
| JP | 2001-318395 | 11/2001 |
| WO | 2018/198478 A1 | 11/2018 |

\* cited by examiner

FIG. 6
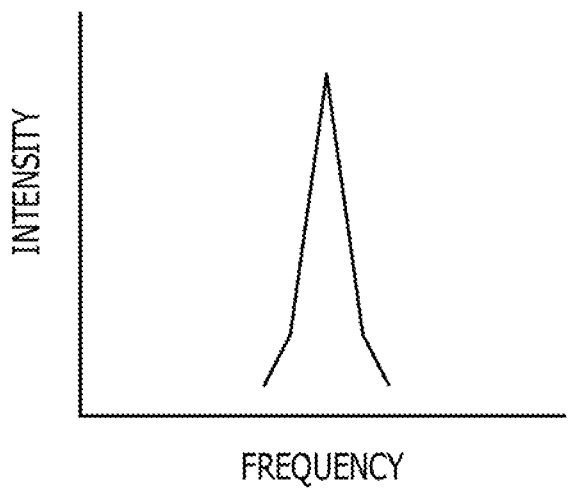
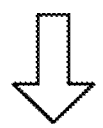
ADJUST FIRST AND SECOND DELAY AMOUNTS TO MINIMIZE FREQUENCY INTENSITY
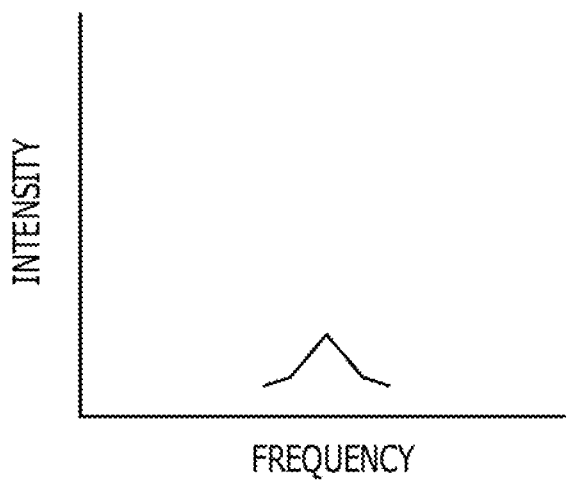

WAVELENGTH CONVERTER APPARATUS AND METHOD OF PERFORMING WAVELENGTH CONVERSION

CROSS-REFERENCE TO RELATED APPLICATION

This application is based upon and claims the benefit of priority of the prior Japanese Patent Application No. 2019-12386, filed on Jan. 28, 2019, the entire contents of which are incorporated herein by reference.

FIELD

The embodiments discussed herein are related to a wavelength converter and a method of performing wavelength conversion.

BACKGROUND

As demand for communication increases, for increasing transmission capacity, for example, the number of cores of optical fibers, capacity of optical signals per wavelength, and the number of wavelength division multiplexing (WDM) channels are increased.

However, since the cost of, for example, laying optical fibers is high, it is required to increase the transmission capacity without increasing the number of optical fiber cores. Increases in optical signal capacity and the number of WDM channels are required for the transmission devices for increasing the transmission capacity. However, there is a limit to the increase in the transmission capacity only with the existing communication bands, for example, the conventional communication band (C-band). For a further increase in the transmission capacity, it is required to use the long wavelength band (L-band) in a long wavelength range and the short wavelength band (S-band) in a short wavelength range.

However, optical components such as an optical transceiver, a wavelength multiplexer/demultiplexer, and an optical amplifier for, for example, the L-band and S-band are required to be independently developed. Thus, the cost of the transmission device using optical components for the L-band and S-band is high compared the cost of the transmission device only using optical components for the C-band. By using the wavelength converter, high capacity transmission may be performed with a transmission device using C-band optical components.

Meanwhile, in the wavelength converter, it is important to increase wavelength conversion efficiency. However, for increasing the wavelength conversion efficiency, it is required to increase the power of the pump light. When high-intensity monochromatic pump light is input to an optical fiber, stimulated Brillouin scattering (SBS) occurs in which input light is scattered backward and does not propagate. For example, when a fiber having a small core diameter referred to as a highly nonlinear fiber is used, the likelihood of occurring of SBS increases.

Thus, according to the related art, the spectral width of pump light is increased by performing phase modulation of about some hundred MHz to some GHz on monochromatic pump light to suppress SBS. As a result, high-power pump light is able to be input to the optical fiber. Thus, high wavelength conversion efficiency may be reliably obtained.

Accordingly, in the wavelength converter, phase modulation is performed on pump light and signal light not having undergone wavelength conversion, and a modulation component of the signal light having undergone the phase modulation and a modulation component of the pump light having undergone the phase modulation are canceled out each other, thereby the modulation component is reduced in the signal light after the wavelength conversion. This may suppress degradation in signal characteristic after the wavelength conversion.

For example, as the related art, Japanese Laid-open Patent Publication Nos. 2001-318395, 10-221656, and 11-225109 are disclosed.

SUMMARY

According to an aspect of the embodiments, an apparatus includes a wavelength converter includes a first phase modulator configured to perform phase modulation on pump light in accordance with a first phase modulation signal, a second phase modulator configured to perform phase modulation on signal light in accordance with a second phase modulation signal, a wavelength converter configured to multiplex the signal light having undergone the phase modulation with the pump light having undergone the phase modulation, the wavelength converter configured to perform wavelength conversion on the signal light in accordance with the pump light, a detector configured to detect a modulation component from the signal light having undergone the phase modulation and the pump light having undergone the phase modulation, and a generator configured to generate the first phase modulation signal and the second phase modulation signal so as to minimize the detected modulation component.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of the frequency intensity before and after the delay adjustment performed by the generation unit.

DESCRIPTION OF EMBODIMENTS

In the wavelength converter, when the pump light and the signal light not having undergone the wavelength conversion undergo the phase modulation, there are generated the difference in phase timing between the signal light having undergone the phase modulation and the pump light having undergone the phase modulation and the difference in degree of modulation between the signal light having undergone the phase modulation and the pump light having undergone the phase modulation. Thus, the modulation component remains in the signal light after the wavelength conversion due to these differences. As a result, the signal characteristics after the wavelength conversion are degraded by the remaining modulation component.

According to an aspect, it is an object to provide a wavelength converter or the like that may suppress degradation in signal characteristic after wavelength conversion.

Embodiments of a wavelength converter and so forth disclosed herein will be described in detail below with reference to the drawings. The disclosed technology is not limited by the embodiments. The embodiments described below may be appropriately combined as long as combined embodiments are consistent with each other.

First Embodiment

Figure 1:
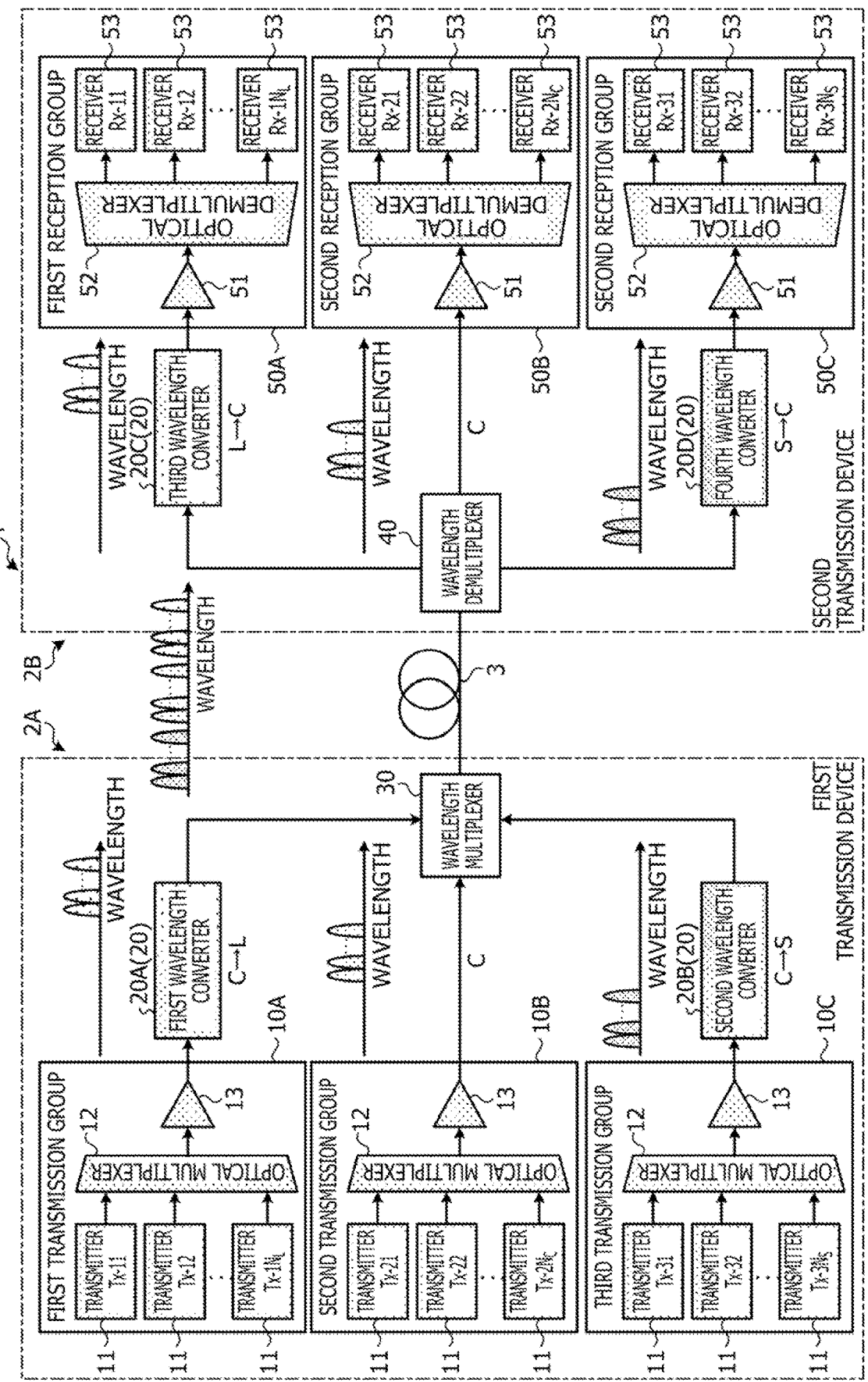
FIG. 1 illustrates an example of a wavelength division multiplexing (WDM) system according to a first embodiment.

FIG. 1 illustrates an example of a wavelength division multiplexing (WDM) system 1 according to a first embodiment. The WDM system 1 illustrated in FIG. 1 includes a first transmission device 2A, a second transmission device 2B, and a transmission path 3 such as an optical fiber coupling the first transmission device 2A and the second transmission device 2B to each other. The WDM system 1 is a multiband system that transmits multiplexed light of different spectrum bands such as, for example, the conventional band (C-band), the long wavelength band (L-band), and the short wavelength band (S-band).

The first transmission device 2A includes a first transmission group 10A, a second transmission group 10B, a third transmission group 10C, a first wavelength converter 20A (20), a second wavelength converter 208 (20), and a wavelength multiplexer 30. The first transmission group 10A Includes a plurality of C-band transmitters 11, an optical multiplexer 12, and an optical amplifier 13. The transmitters 11 output signal light of different wavelengths of the C-band to the optical multiplexer 12. The optical multiplexer 12 multiplexes the signal light from the transmitters 11 and outputs first multiplexed light of the C-band to the optical amplifier 13. The optical amplifier 13 is, for example, an erbium doped optical fiber amplifier (EDFA). The optical amplifier 13 optically amplifies the first multiplexed light and outputs to the first wavelength converter 20A the first multiplexed light of the C-band having undergone the optical amplification.

The second transmission group 10B includes a plurality of C-band transmitters 11, an optical multiplexer 12, and an optical amplifier 13. The transmitters 11 output signal light of different C-band wavelengths to the optical multiplexer 12. The optical multiplexer 12 multiplexes the signal light from the transmitters 11 and outputs first multiplexed light of the C-band to the optical amplifier 13. The optical amplifier 13 optically amplifies the first multiplexed light and outputs to the wavelength multiplexer 30 the first multiplexed light of the C-band having undergone the optical amplification.

The third transmission group 10C includes a plurality of C-band transmitters 11, an optical multiplexer 12, and an optical amplifier 13. The transmitter 11 outputs signal light of different C-band wavelengths to the optical multiplexer 12. The optical multiplexer 12 multiplexes the signal light from the transmitters 11 and outputs first multiplexed light of the C-band to the optical amplifier 13. The optical amplifier 13 optically amplifies the first multiplexed light and outputs to the second wavelength converter 20B the first multiplexed light of the C-band having undergone amplification. The first transmission group 10A, the second transmission group 10B, and the third transmission group 10C includes the optical amplifiers 13 therein. However, the first transmission group 10A, the second transmission group 10B, and the third transmission group 10C do not necessarily include the optical amplifiers 13 when the first multiplexed light from the optical multiplexers 12 is able to obtain sufficient power. The settings regarding this may be appropriately changed.

The first wavelength converter 20A employs a degenerate four-wave mixing method so as to perform wavelength conversion on the first multiplexed light of the C-band from the first transmission group 10A so as to obtain, by using pump light, second multiplexed light of the L-band. The first wavelength converter 20A outputs to the wavelength multiplexer 30 the second multiplexed light of the L-band after the wavelength conversion.

The second wavelength converter 20B employs a degenerate four-wave mixing method so as to perform wavelength conversion on the first multiplexed light of the C-band from the third transmission group 10C so as to obtain, by using pump light, third multiplexed light of the S-band. The second wavelength converter 20B outputs to the wavelength multiplexer 30 the third multiplexed light of the S-band after the wavelength conversion.

The wavelength multiplexer 30 multiplexes the first multiplexed light of the C-band from the second transmission group 10B, the second multiplexed light of the L-band from the first wavelength converter 20A, and the third multiplexed light of the S-band from the second wavelength converter 20B and outputs the first to third multiplexed light to the transmission path 3.

The second transmission device 2B includes a wavelength demultiplexer 40, a third wavelength converter 20C (20), a fourth wavelength converter 20D (20), a first reception group 50A, a second reception group 50B, and a third reception group 50C. The wavelength demultiplexer 40 demultiplexes the multiplexed light received through the transmission path 3 into the first multiplexed light of the C-band, the second multiplexed light of the L-band, and the third multiplexed light of the S-band. The wavelength demultiplexer 40 outputs the first multiplexed light to the second reception group 50B, the second multiplexed light to the third wavelength converter 20C, and the third multiplexed light to the fourth wavelength converter 20D.

The second reception group 50B includes an optical amplifier 51, an optical demultiplexer 52, and a plurality of receivers 53. The optical amplifier 51 optically amplifies the first multiplexed light of the C-band from the wavelength demultiplexer 40 and outputs to the optical demultiplexer 52 the first multiplexed light having undergone the optical amplification. The optical amplifier 51 is, for example, an erbium doped optical fiber amplifier (EDFA). The optical demultiplexer 52 demultiplexes the first multiplexed light into beams of signal light of the C-band of respective wavelengths and outputs the signal light to the receivers 53.

The third wavelength converter 20C performs wavelength conversion on, by using pump light, the second multiplexed light of the L-band from the wavelength demultiplexer 40 so as to obtain the first multiplexed light of the C-band and outputs to the first reception group 50A the first multiplexed light of the C-band after the wavelength conversion. The first reception group 50A includes an optical amplifier 51, an optical demultiplexer 52, and a plurality of receivers 53. The optical amplifier 51 optically amplifies the first multiplexed light of the C-band from the third wavelength converter 20C after the wavelength conversion and outputs to the optical demultiplexer 52 the first multiplexed light having undergone the optical amplification. The optical demultiplexer 52 demultiplexes the first multiplexed light into beams of signal light of the C-band of respective wavelengths and outputs the beams of signal light to the receivers 53. The transmitters 11 of the first transmission group 10A communicate with the respective receivers 53 of the first reception group 50A at respective arbitrary wavelengths of the C-band. For example, one of the transmitters 11, Tx-11, of the first transmission group 10A and a corresponding one of the receivers 53, Rx-12, of the first reception group 50A use signal light of the same wavelength C1, and the transmitter 11, Tx-11, transmits the signal light at the same wavelength C1 as that of the receiver 53 of Rx-12. Likewise, the transmitters 11 of the second transmission group 10B communicate with the respective receivers 53 of the second reception group 50B at respective arbitrary wavelengths of the C-band. For example, each of the transmitters 11 and a corresponding one of the receivers 53 form a communication pair using the same wavelength.

The fourth wavelength converter 20D wavelength-converts, by using pump light, the third multiplexed light of the S-band from the wavelength demultiplexer 40 into the first multiplexed light of the C-band and outputs to the third reception group 50C the first multiplexed light of the C-band after the wavelength conversion. The third reception group 50C Includes an optical amplifier 51, an optical demultiplexer 52, and a plurality of receivers 53. The optical amplifier 51 optically amplifies the first multiplexed light of the C-band after the wavelength conversion from the fourth wavelength converter 20D and outputs to the optical demultiplexer 52 the first multiplexed light having undergone the optical amplification. The optical demultiplexer 52 demultiplexes the first multiplexed light into beams of signal light of the C-band of respective wavelengths and outputs the beams of signal light to the receivers 53. The transmitters 11 of the third transmission group 10C communicate with the respective receivers 53 of the third reception group 50C at respective arbitrary wavelengths of the C-band. For example, one of the transmitters 11, Tx-32, of the third transmission group 10C and a corresponding one of the receivers 53, Rx-31, of the third reception group 50C use signal light of the same wavelength C2, and Tx-31 of the transmitters 11 transmits the signal light at the same wavelength C2 as that of the receiver 53, Rx-32. For example, each of the transmitters 11 and a corresponding one of the receivers 53 form a communication pair using the same wavelength.

Figure 2:
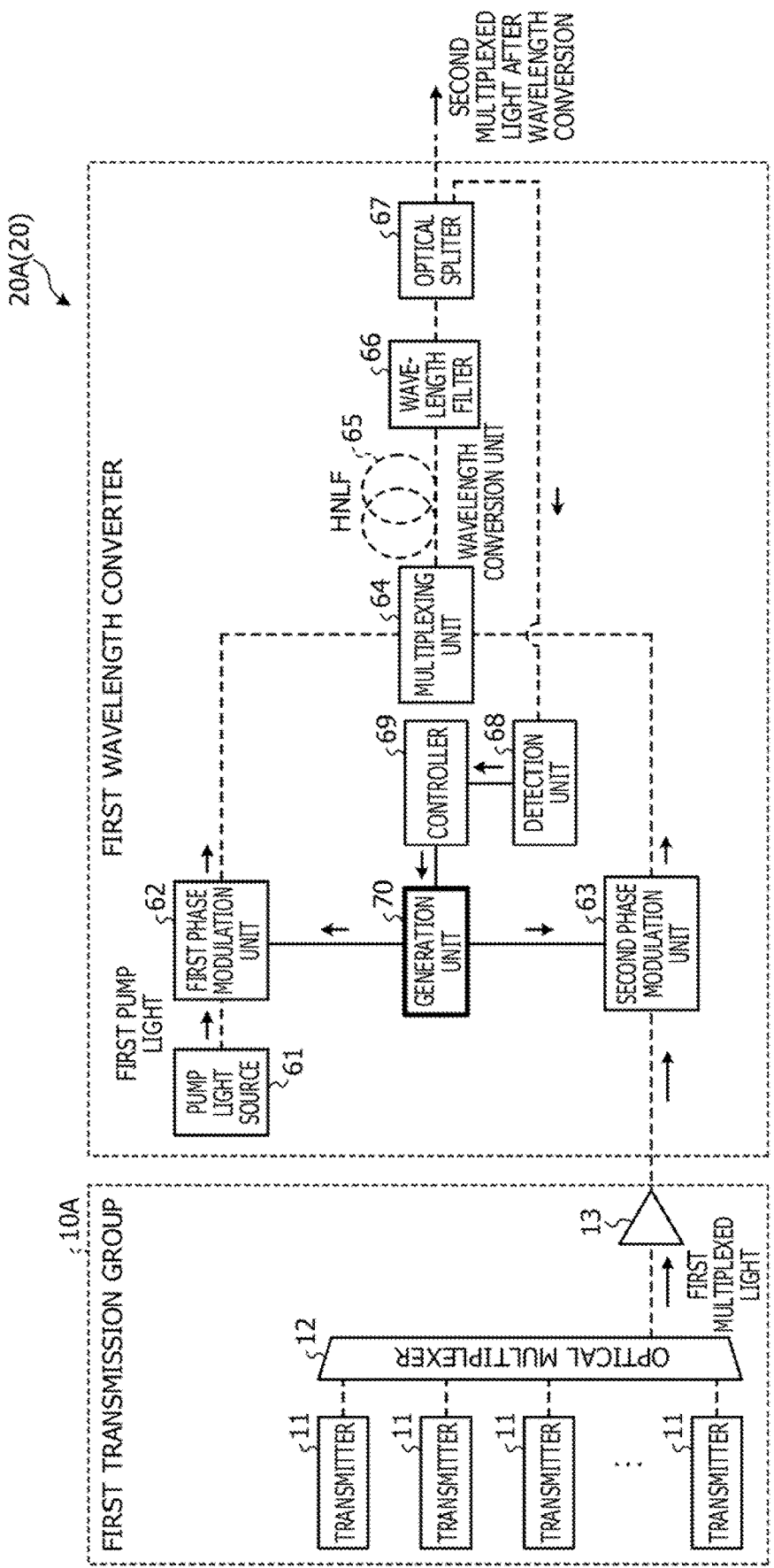
FIG. 2 illustrates an example of a wavelength converter according to the first embodiment.

FIG. 2 illustrates an example of a wavelength converter 20 according to the first embodiment. For convenience of description, the wavelength converter 20 illustrated in FIG. 2 is described by exemplifying, for example, the first wavelength converter 20A. The first wavelength converter 20A Illustrated in FIG. 2 includes a pump light source 61, a first phase modulation unit 62, a second phase modulation unit 63, a multiplexing unit 64, a wavelength conversion unit 65, a wavelength filter 66, an optical splitter 67, a detection unit 68, a controller 69, and a generation unit 70. The pump light source 61 generates pump light such as, for example, first pump light. The first phase modulation unit 62 performs phase modulation on the first pump light from the pump light source 61 in accordance with a first phase modulation signal. As a result, a stimulated Brillouin scattering (SBS) component may be suppressed by the phase modulation in the signal light after the wavelength conversion. The second phase modulation unit 63 performs phase modulation on the first multiplexed light from the first transmission group 10A in accordance with a second phase modulation signal. As a result, the SBS component may be suppressed by the phase modulation in the signal light after the wavelength conversion. The multiplexing unit 64 multiplexes the first pump light from the first phase modulation unit 62 having undergone the phase modulation and the first multiplexed light from the second phase modulation unit 63 having undergone the phase modulation. The wavelength conversion unit 65 includes, for example, a highly nonlinear fiber optical (HNLF) or the like and performs wavelength conversion on the first multiplexed light of the C-band so as to obtain the second multiplexed light of the L-band by using the first multiplexed light and the first pump light from the multiplexing unit 64. As a result, the SBS component may be suppressed by the phase modulation in the second multiplexed light of the L-band. The wavelength filter 66 transmits the second multiplexed light after the wavelength conversion from the wavelength conversion unit 65. The optical splitter 67 optically splits the second multiplexed light transmitted through the wavelength filter 66 to a wavelength multiplexer 30 and the detection unit 68.

The detection unit 68 detects a modulation component of the first phase modulation unit 62 and the second phase modulation unit 63 from the second multiplexed light from the optical splitter 67. The modulation component includes the difference in phase timing between the signal light having undergone the phase modulation and the pump light having undergone the phase modulation and the difference in degree of modulation between the signal light having undergone the phase modulation and the pump light having undergone the phase modulation. The controller 69 controls the generation unit 70 in accordance with the modulation component detected by the detection unit 68 so as to minimize the modulation component detected by the detection unit 68. The generation unit 70 generates, in accordance with a control signal from the controller 69, the first phase modulation signal for adjustment of the first phase modulation unit 62 and the second phase modulation signal for adjustment of the second phase modulation unit 63.

Figure 3:
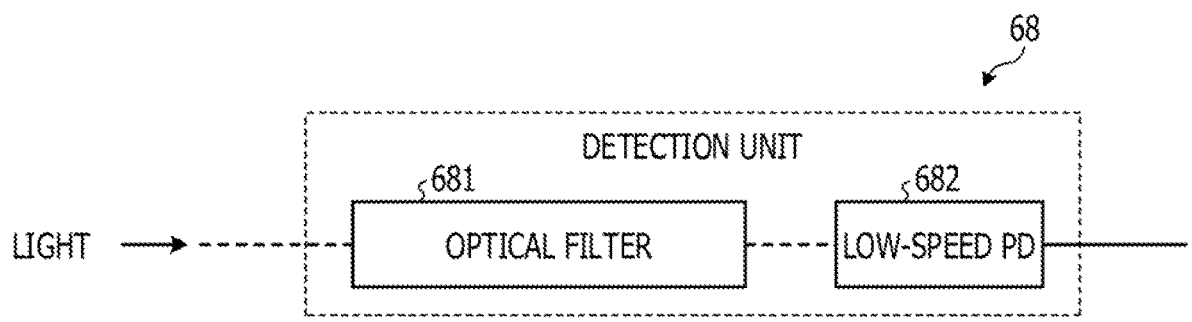
FIG. 3 illustrates an example of a detection unit.

FIG. 3 illustrates an example of the detection unit 68. The detection unit 68 illustrated in FIG. 3 includes an optical filter 681 and a low-speed photo diode (PD) 68B. The optical filter 681, which extracts the modulation component from the second multiplexed light having been optically split by the optical splitter 67, exhibits wavelength dependent loss. The optical filter 681 transmits the modulation component of the second multiplexed light and outputs the modulation component to a low-speed PD 682. The low-speed PD 682 is a photoelectric converter that converts a modulation component into electricity. The low-speed PD 682 outputs the modulation component having been converted into electricity to the controller 69.

Figure 4:
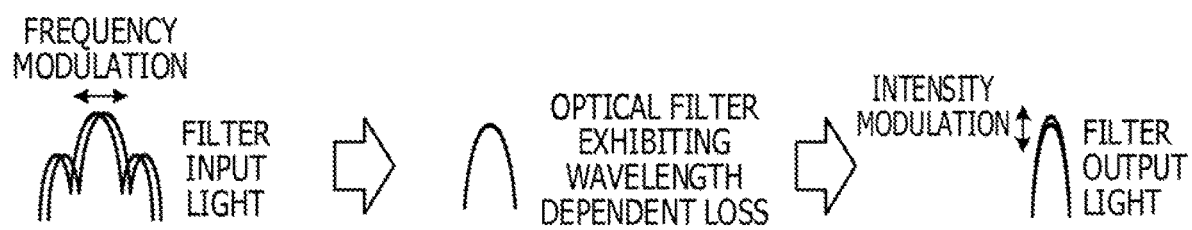
FIG. 4 illustrates an example of processing performed by an optical filter of the detection unit.

FIG. 4 illustrates an example of processing performed by the optical filter 681 of the detection unit 68. The optical filter 681 includes, for example, a filter such as a wavelength filter having a characteristic of reducing loss for a specific wavelength or a filter having a periodic loss characteristic. The optical filter 681 converts a frequency modulation component of the second multiplexed light into an intensity modulation component and outputs to the low-speed PD 682 the intensity modulation component as the modulation component.

Figure 5:
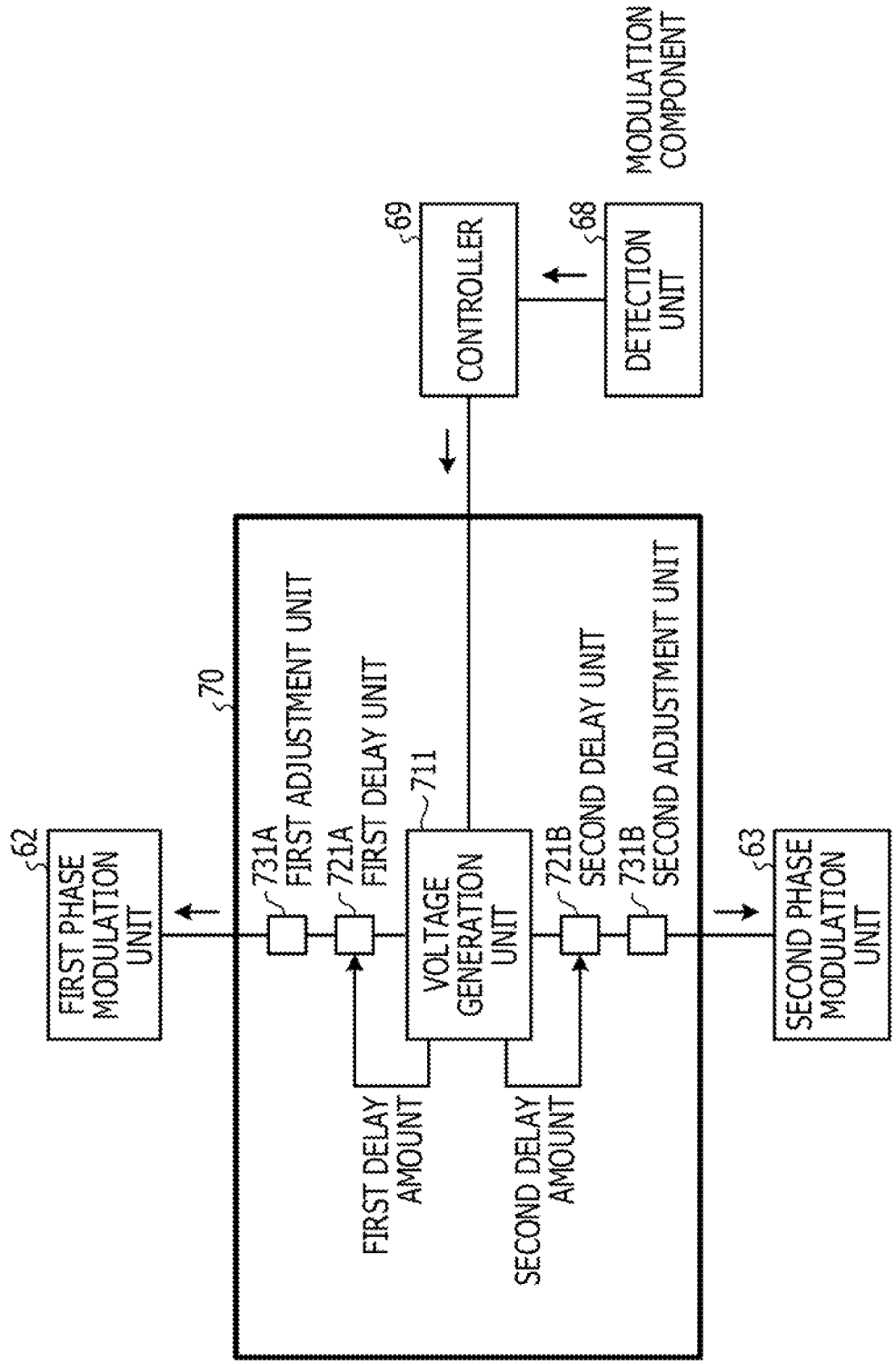
FIG. 5 illustrates an example of a generation unit.

FIG. 5 illustrates an example of the generation unit 70. The generation unit 70 illustrated in FIG. 5 includes a voltage generation unit 711, a first delay unit 721A, a first adjustment unit 731A, a second delay unit 721B, and a second adjustment unit 731B. The voltage generation unit 711 generates, in accordance with the control signal from the controller 69, the first phase modulation signal and the second phase modulation signal. The first phase modulation signal and the second phase modulation signal are voltage signals. The first delay unit 721A adjusts a delay amount of the first phase modulation signal from the voltage generation unit 711 to adjust the phase of the adjusted first phase modulation signal. The first adjustment unit 731A adjusts a resistance value, adjusts the degree of modulation of the first phase modulation signal having undergone the adjustment by the first delay unit 721A, and outputs the first phase modulation signal having undergone the adjustment to the first phase modulation unit 62.

The second delay unit 721B adjusts a delay amount of the second phase modulation signal from the voltage generation unit 711 to adjust the phase of the adjusted second phase modulation signal. The second adjustment unit 731B adjusts a resistance value, adjusts the degree of modulation of the second phase modulation signal having undergone the phase adjustment from the second delay unit 721B, and outputs the second phase modulation signal having undergone the adjustment to the second phase modulation unit 63.

FIG. 6 illustrates an example of the frequency intensity before and after the delay adjustment performed by the generation unit 70. As illustrated in FIG. 6, the voltage generation unit 711 adjusts the delay amount of the first delay unit 721A or the second delay unit 721B so as to minimize the modulation component (frequency intensity). The voltage generation unit 711 generates the first phase modulation signal and the second phase modulation signal with which the modulation component is minimized. For example, the voltage generation unit 711 generates the first phase modulation signal and the second phase modulation signal so as to minimize the difference in phase timing between the modulation component of the pump light and the modulation component of the signal light and the difference in degree of modulation between the modulation component of the pump light and the modulation component of the signal light. The first phase modulation unit 62 performs phase modulation on the pump light in accordance with the first phase modulation signal so as to minimize (cancel) the modulation component of the first multiplexed light in the multiplexing unit 64. Also, the second phase modulation unit 63 performs phase modulation on the first multiplexed light in accordance with the second phase modulation signal so as to minimize (cancel) the modulation component of the pump light in the multiplexing unit 64. The voltage generation unit 711 generates the first phase modulation signal and the second phase modulation signal such that the modulation component of the pump light and the modulation component of the signal light in phase with each other or in opposite phase to each other cancel out each other in the multiplexing unit 64.

Next, operation of the wavelength converter 20 according to the first embodiment is described. The first phase modulation unit 62 of the first wavelength converter 20A receives the first pump light from the pump light source 61 and performs phase modulation on the first pump light in accordance with the first phase modulation signal from the generation unit 70. The first phase modulation unit 62 outputs the first pump light having undergone the phase modulation to the multiplexing unit 64.

The second phase modulation unit 63 receives the first multiplexed light from the first transmission group 10A and performs phase modulation on the first multiplexed light in accordance with the second phase modulation signal from the generation unit 70. The second phase modulation unit 63 outputs the first multiplexed light having undergone the phase modulation to the multiplexing unit 64. The multiplexing unit 64 multiplexes the first pump light having undergone the phase adjustment and the first multiplexed light having undergone the phase adjustment and outputs the multiplexed light to the wavelength conversion unit 65.

The wavelength conversion unit 65 receives the first pump light and the first multiplexed light from the multiplexing unit 64, performs wavelength conversion on the first multiplexed light of the C-band so as to obtain the second multiplexed light of the L-band by using the first pump light, and outputs the second multiplexed light after the wavelength conversion to the optical splitter 67 through the wavelength filter 66. The optical splitter 67 optically splits the second multiplexed light to a wavelength multiplexer 30 and the detection unit 68.

The detection unit 68 performs intensity conversion on the modulation component in the second multiplexed light having been optically split and outputs the modulation component after the intensity conversion to the controller 69. Based on the modulation component from the detection unit 68, the controller 69 outputs to the generation unit 70 the control signal with which the modulation component is minimized. The generation unit 70 generates, in accordance with the control signal, the first phase modulation signal to be applied to the first phase modulation unit 62 and the second phase modulation signal to be applied to the second phase modulation unit 63.

The first phase modulation unit 62 applies the first phase modulation signal to a waveguide through which the first pump light passes so as to adjust the phase of the first pump light. The second phase modulation unit 63 applies the second phase modulation signal to a waveguide through which the first multiplexed light passes so as to adjust the phase of the first multiplexed light. The wavelength conversion unit 65 performs wavelength conversion on the first multiplexed light having undergone the phase adjustment so as to obtain the second multiplexed light by using the first pump light having undergone the phase adjustment. As a result, SBS is suppressed, thereby degradation in signal characteristic of the second multiplexed light may be suppressed.

Figure 7:
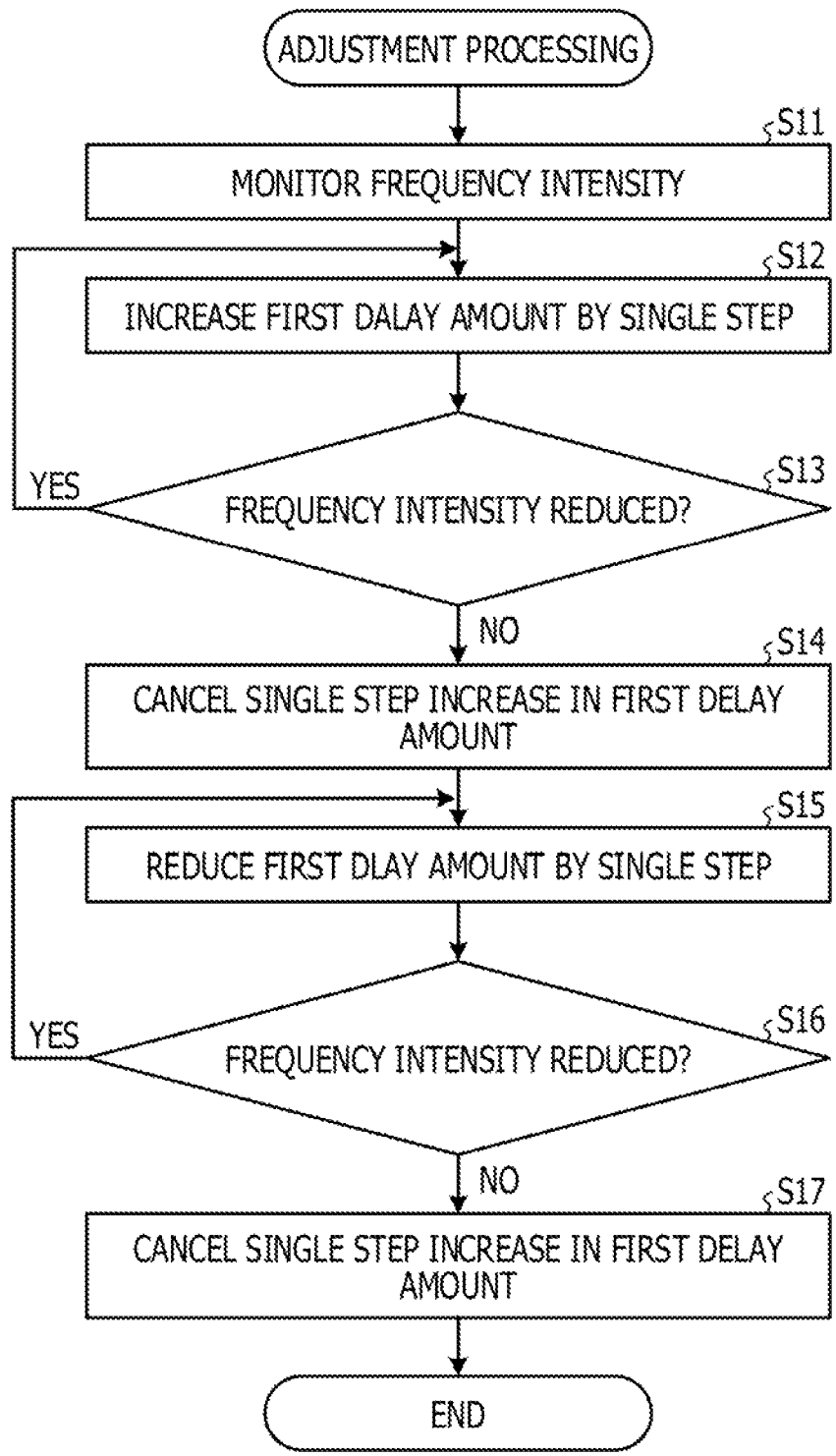
FIG. 7 is a flowchart Illustrating an example of a processing operation of a controller related to adjustment processing.

FIG. 7 is a flowchart illustrating an example of a processing operation of the controller 69 related to adjustment processing. In FIG. 7, the controller 69 monitors the frequency intensity (modulation component) detected by the detection unit 68 (step S11) and increases, based on a result of the monitoring, a first delay amount of the first delay unit 721A by a single step (step S12). The term "single step" refers to a predetermined delay amount. The controller 69 increases the first delay amount and determines whether the frequency intensity (modulation component) reduces (step S13). When the frequency intensity (modulation component) reduces (positive in step S13), the controller 69 returns to the processing in step S12 to further increase the first delay amount by a single step.

When the frequency intensity (modulation component) does not reduce (negative in step S13), the controller 69 cancels the single-step increase in the first delay amount (step S14) and reduces the first delay amount by a single step (step S15). The controller 69 reduces the first delay amount and determines whether the frequency intensity (modulation component) reduces (step S16). When the frequency intensity (modulation component) reduces (positive in step S16), the controller 69 returns to the processing in step S15 to further reduce the first delay amount by a single step. When the frequency intensity (modulation component) does not reduce (negative in step S16), the controller 69 cancels the single-step reduction in the first delay amount (step S17) and ends the processing operation Illustrated in FIG. 7.

The controller 69 that performs the adjustment processing adjusts the first delay amount and the second delay amount so as to minimize the frequency intensity (modulation component). This minimizes the difference in phase timing between the modulation component of the pump light having undergone the phase modulation and the modulation component of the signal light having undergone the phase modulation. As a result, since the difference in phase timing between modulation component of the pump light and the modulation component of the signal light is minimized, of course, the SBS of the signal light after the wavelength conversion may be suppressed, and further, the modulation component of the signal light after the wavelength conversion may be reduced.

The controller 69 generates the first phase modulation signal and the second phase modulation signal so as to minimize the difference in degree of modulation between the modulation component of the pump light and the modulation component of the signal light to minimize the modulation component. As a result, since the difference in degree of modulation between modulation component of the pump light and the modulation component of the signal light is minimized, of course, the SBS of the signal light after the wavelength conversion may be suppressed, and further, the modulation component of the signal light after the wavelength conversion may be reduced.

The first wavelength converter 20A according to the first embodiment detects the modulation component from the second multiplexed light after the wavelength conversion and generates the first phase modulation signal and the second phase modulation signal so as to minimize the modulation component. As a result, since the modulation component from the second multiplexed light is minimized, the first wavelength converter 20A may suppress degradation in signal characteristic of the second multiplexed light.

The first wavelength converter 20A generates the first phase modulation signal and the second phase modulation signal so as to minimize the difference in phase timing between the modulation component of the first pump light having undergone the phase modulation and the modulation component of the first multiplexed light (signal light) having undergone the phase modulation and minimize the difference in degree of modulation between the modulation component of the pump light having undergone the phase modulation and the modulation component of the signal light having undergone the phase modulation. As a result, the modulation component of the signal light and the modulation component of the pump light cancel out each other, and the difference in phase timing between the modulation component of the signal light and the modulation component of the pump light and the difference in degree of modulation between the modulation component of the signal light and the modulation component of the pump light are minimized. Thus, the first wavelength converter 20A may suppress degradation in signal characteristic of the second multiplexed light.

There is no difference in detected modulation component whether control of synchronization of the phase timing or control of the degree of modulation is changed. Thus, when both the synchronization of the phase timing and the degree of modulation are simultaneously controlled, an optimum point is not necessarily passed. Accordingly, when the control is performed, only one of the synchronization of the phase timing and the degree of modulation is changed. Also when attaining the optimum point, the synchronization of the phase timing and the degree of modulation are alternately controlled.

In the exemplified first wavelength converter 20A according to the first embodiment detects, by using the detection unit 68, the modulation component from the second multiplexed light after the wavelength conversion in the wavelength conversion unit 65. This is also applicable to the second wavelength converter 20B, the third wavelength converter 20C, and the fourth wavelength converter 20D. For example, the second wavelength converter 20B detects, by using the detection unit 68 thereof, the modulation component from the third multiplexed light after the wavelength conversion in the wavelength conversion unit 65 thereof. Also, the third wavelength converter 20C and the fourth wavelength converter 20D detect, by using the respective detection units 68, the modulation component from the first multiplexed light after the wavelength conversion in the respective wavelength conversion units 65.

The exemplified first wavelength converter 20A according to the first embodiment detects the modulation component from the second multiplexed light after the wavelength conversion in the wavelength conversion unit 65 and adjusts the first phase modulation unit 62 and the second phase modulation unit 63 so as to minimize the modulation component. However, this is not limiting. For example, the first phase modulation unit 62 and the second phase modulation unit 63 may be adjusted such that the difference in modulation component between the pump light having undergone the phase modulation in the first phase modulation unit 62 before the wavelength conversion and the pump light having undergone the phase modulation in the second phase modulation unit 63 before the wavelength conversion is minimized. An embodiment of this is described below as a second embodiment.

Second Embodiment

Figure 8:
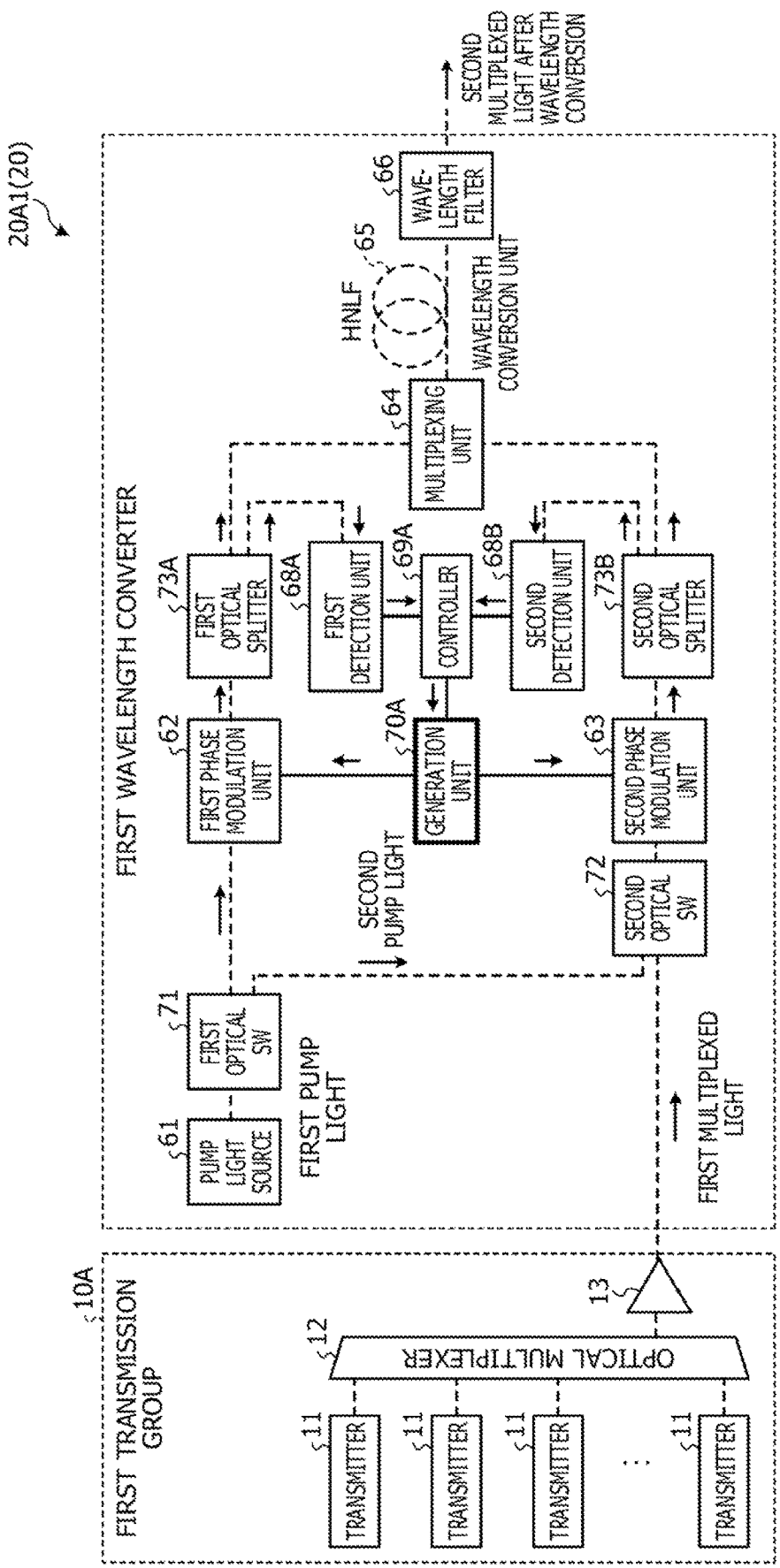
FIG. 8 illustrates an example of the wavelength converter according to a second embodiment.

FIG. 8 illustrates an example of the wavelength converter 20 according to a second embodiment. For convenience of description, the wavelength converter 20 illustrated in FIG. 8 is described by exemplifying, for example, a first wavelength converter 20A1. The first wavelength converter 20A1 Includes the pump light source 61, the first phase modulation unit 62, the second phase modulation unit 63, a multiplexing unit filter 68164, the wavelength conversion unit 65, and the wavelength filter 66. In addition, the first wavelength converter 20A1 Includes a first optical switch (SW) 71, a second optical SW 72, a first optical splitter 73A, a second optical splitter 73B, a first detection unit 68A, a second detection unit 68B, a controller 69A, and a generation unit 70A.

The first optical SW 71 is disposed between the pump light source 61 and the first phase modulation unit 62, optically splits the pump light from the pump light source 61, and outputs the optically split pump light to the first phase modulation unit 62 and the second optical SW 72. For convenience of description, pump light to be input to the first phase modulation unit 62 is referred to as first pump light, and pump light to be input to the second optical SW 72 is referred to as second pump light. The second optical SW 72 is disposed between the optical amplifier 13 of the first transmission group 10A and the second phase modulation unit 63 and outputs to the second phase modulation unit 63 the second pump light from the first optical SW 71 or the first multiplexed light from the optical amplifier 13 by switching the output between the second pump light and the first multiplexed light. For example, before the start of operation, the second optical SW 72 performs the switching to output the first pump light from the first optical SW 71 to the second phase modulation unit 63 and, after the start of the operation, the second optical SW 72 performs the switching to output the first multiplexed light from the optical amplifier 13 to the second phase modulation unit 63.

The first optical splitter 73A is disposed between the first phase modulation unit 62 and the multiplexing unit 64, optically splits the first pump light having undergone the phase modulation in the first phase modulation unit 62, and outputs the first pump light having undergone the optical splitting to the multiplexing unit 64 and the first detection unit 68A. The second optical splitter 73B is disposed between the second phase modulation unit 63 and the multiplexing unit 64, optically splits the second pump light or the first multiplexed light having undergone the phase modulation in the second phase modulation unit 63, and outputs the second pump light or the first multiplexed light having undergone the optical splitting to the multiplexing unit 64 and the second detection unit 68B.

The first detection unit 68A detects a first modulation component of the first pump light having undergone the optical split performed by the first optical splitter 73A. The second detection unit 68B detects a second modulation component of the second pump light having undergone the optical split performed by the second optical splitter 73B. The controller 69A outputs to the generation unit 70A a control signal for generating a phase modulation signal with which the difference between the first modulation component and the second modulation component, for example, a phase difference, is minimized based on the difference between the first modulation component detected by the first detection unit 68A and the second modulation component detected by the second detection unit 68B. The generation unit 70A generates, in accordance with the control signal from the controller 69A, the first phase modulation signal to be applied to a waveguide in the first phase modulation unit 62 and the second phase modulation signal to be applied to a waveguide in the second phase modulation unit 63.

The first phase modulation unit 62 performs phase modulation on the first pump light in accordance with the first phase modulation signal and outputs the first pump light having undergone the phase modulation to the first optical splitter 73A. Before the start of the operation, the second phase modulation unit 63 performs phase modulation on the second pump light in accordance with the second phase modulation signal and outputs the second pump light having undergone the phase modulation to the second optical splitter 73B. After the start of the operation, the second phase modulation unit 63 performs phase modulation on the first multiplexed light in accordance with the second phase modulation signal and outputs the first multiplexed light having undergone the phase modulation to the second optical splitter 73B. After the start of the operation, the multiplexing unit 64 multiplexes the first pump light having undergone the phase modulation and having been split by the first optical splitter 73A with the first multiplexed light having undergone the phase modulation and having been split by the second optical splitter 73B, and the multiplexing unit 64 outputs the multiplexed light to the wavelength conversion unit 65. After the start of the operation, the wavelength conversion unit 65 receives the first pump light having undergone the phase modulation and the first multiplexed light having undergone the phase modulation and performs wavelength conversion on the first multiplexed light so as to obtain the second multiplexed light by using the first pump light.

Figure 9:
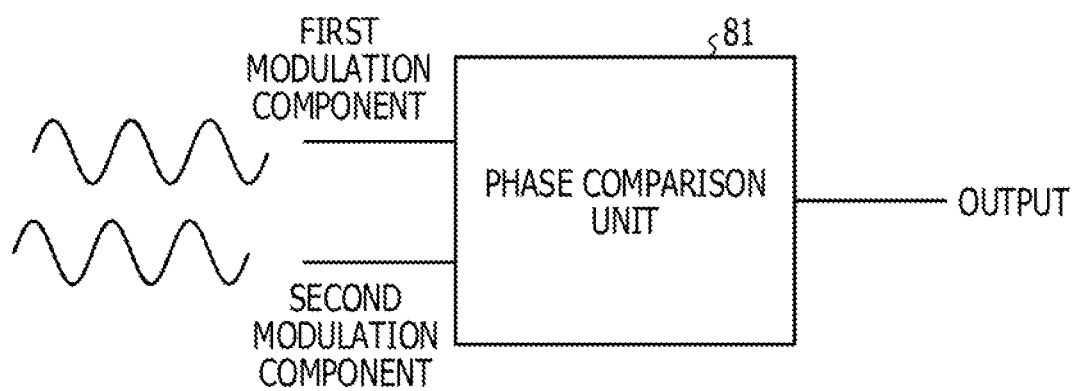
FIG. 9 illustrates an example of a controller.

FIG. 9 illustrates an example of the controller 69A according to the second embodiment. The controller 69A illustrated in FIG. 9 includes a phase comparison unit 81. The phase comparison unit 81 compares the first modulation component from the first detection unit 68A and the second modulation component from the second detection unit 68B with each other and outputs the phase difference between the first modulation component and the second modulation component.

Figure 10:
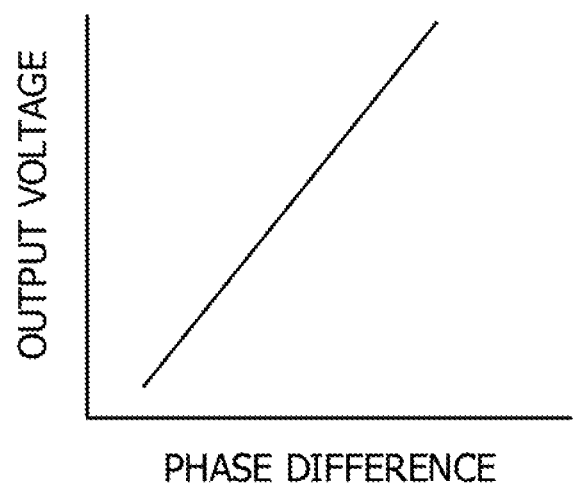
FIG. 10 illustrates an example of the relationship between the phase difference and an output voltage of a voltage generation unit.
Figure 11:
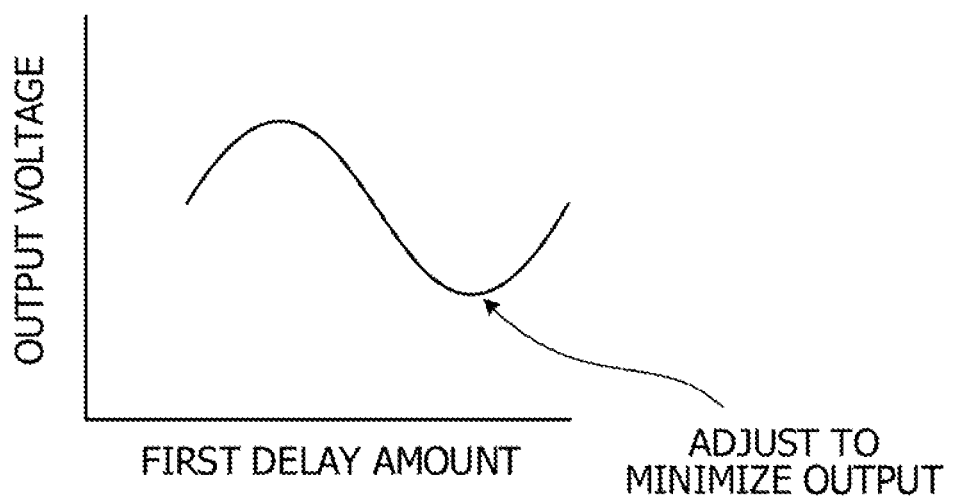
FIG. 11 illustrates an example of the relationship between a first delay amount and the output voltage of the voltage generation unit.

FIG. 10 illustrates an example of the relationship between the phase difference and an output voltage of the voltage generation unit 711. The voltage generation unit 711 detects the phase difference from the phase comparison unit 81 of the controller 69A and generates the output voltage (phase modulation signal) corresponding to the phase difference as illustrated in FIG. 10. FIG. 11 illustrates an example of the relationship between the first delay amount and the output voltage (phase modulation signal) of the voltage generation unit 711. The voltage generation unit 711 generates the first delay amount corresponding to the output voltage (first phase modulation signal). The voltage generation unit 711 also generates the second delay amount corresponding to the output voltage (second phase modulation signal).

Next, operation of the first wavelength converter 20A1 according to the second embodiment is described. Before the start of the operation, the first optical SW 71 and the second optical SW 72 of the first wavelength converter 20A1 perform switching to output the second pump light to the second phase modulation unit 63. The second phase modulation unit 63 receives the second pump light having passed through the second optical SW 72 and performs phase modulation on the second pump light having been input thereto. The second phase modulation unit 63 outputs the second pump light having undergone the phase modulation to the second optical splitter 73B. The second detection unit 68B detects, through the second optical splitter 73B, the second modulation component of the second pump light having undergone the phase modulation.

The first phase modulation unit 62 receives the first pump light from the first optical SW 71 and performs phase modulation on the first pump light having been input thereto. The first phase modulation unit 62 outputs the first pump light having undergone the phase modulation to the first optical splitter 73A. The first detection unit 68A detects, through the first optical splitter 73A, the first modulation component of the first pump light having undergone the phase modulation.

The controller 69A compares the first modulation component from the first detection unit 68A with the second modulation component from the second detection unit 68B, generates the control signal with which the difference between the modulation components is minimized, and outputs the generated control signal to the generation unit 70A. The generation unit 70A generates the first phase modulation signal and the second phase modulation signal in accordance with the control signal and inputs the first phase modulation signal and the second phase modulation signal to the first phase modulation unit 62 and the second phase modulation unit 63, respectively.

As the start of the operation, when the difference between the modulation components is minimized, the controller 69A performs switching control on the first optical SW 71 and the second optical SW 72 to switch to the first phase modulation unit 62 side the output of the first optical SW 71 and switch to the first transmission group 10A side the input of the second optical SW 72. The second optical SW 72 outputs the first multiplexed light to the second phase modulation unit 63. The second phase modulation unit 63 performs phase modulation on the first multiplexed light in accordance with the second phase modulation signal and outputs the first multiplexed light having undergone the phase modulation to the multiplexing unit 64 through the second optical splitter 73B.

The first phase modulation unit 62 performs phase modulation on the first pump light in accordance with the first phase modulation signal and outputs the first pump light having undergone the phase modulation to the multiplexing unit 64 through the first optical splitter 73A. The multiplexing unit 64 multiplexes the first pump light having undergone the phase modulation performed by the first phase modulation unit 62 and the first multiplexed light having undergone the phase modulation performed by the second phase modulation unit 63 and outputs the first multiplexed light and the first pump light having been multiplexed to the wavelength conversion unit 65. The wavelength conversion unit 65 performs wavelength conversion on the first multiplexed light so as to obtain the second multiplexed light in accordance with the first pump light and outputs the second multiplexed light after the wavelength conversion to the wavelength filter 66. As a result, the first wavelength converter 20A1 may output the second multiplexed light with the SBS suppressed.

In the first wavelength converter 20A1 according to the second embodiment, before the start of the operation, switching is performed to input part of the pump light to the second phase modulation unit 63, and the first modulation component is detected from the first pump light having undergone the phase modulation performed by the first phase modulation unit 62. Also in the first wavelength converter 20A1, the second modulation component is detected from the second pump light having undergone the phase modulation performed by the second phase modulation unit 63. The first wavelength converter 20A1 generates the first phase modulation signal and the second phase modulation signal so as to minimize the difference between the first modulation component and the second modulation component. As a result, since the modulation component from the second multiplexed light is minimized, the first wavelength converter 20A1 may suppress degradation in signal characteristic of the second multiplexed light after the start of the operation.

The first wavelength converter 20A1 generates, before the start of the operation, the first phase modulation signal and the second phase modulation signal so as to minimize the difference in phase timing between the first modulation component and the second modulation component and the difference in degree of modulation between the first modulation component and the second modulation component. As a result, after the start of the operation, in the first wavelength converter 20A1, the modulation component of the signal light and the modulation component of the pump light cancel out each other, and the difference in phase timing between the modulation component of the signal light and the modulation component of the pump light and the difference in degree of modulation between the modulation component of the signal light and the modulation component of the pump light are minimized. Thus, degradation in signal characteristic of the second multiplexed light after the start of the operation may be suppressed.

Although the first wavelength converter 20A1 according to the second embodiment exemplifies the case where wavelength conversion is performed on the first multiplexed light so as to obtain the second multiplexed light, this is not limiting. This may be appropriately changed. For example, this is also applicable to the second wavelength converter 20B, the third wavelength converter 20C, and the fourth wavelength converter 20D.

The following case is exemplified with the first wavelength converter 20A1 according to the second embodiment: the pump light is input to the first phase modulation unit 62 and the second phase modulation unit 63 before the start of the operation; and the first modulation component of the first pump light having undergone the phase modulation performed by the first phase modulation unit 62 is compared with the second modulation component of the second pump light having undergone the phase modulation performed by the second phase modulation unit 63. However, comparison is not limited to that between the modulation components of the pump light having undergone the phase modulation. A modulation component of pump light having undergone the phase modulation may be compared with a modulation component of multiplexed light having undergone the phase modulation. An embodiment for this is described below as a third embodiment.

Third Embodiment

Figure 12:
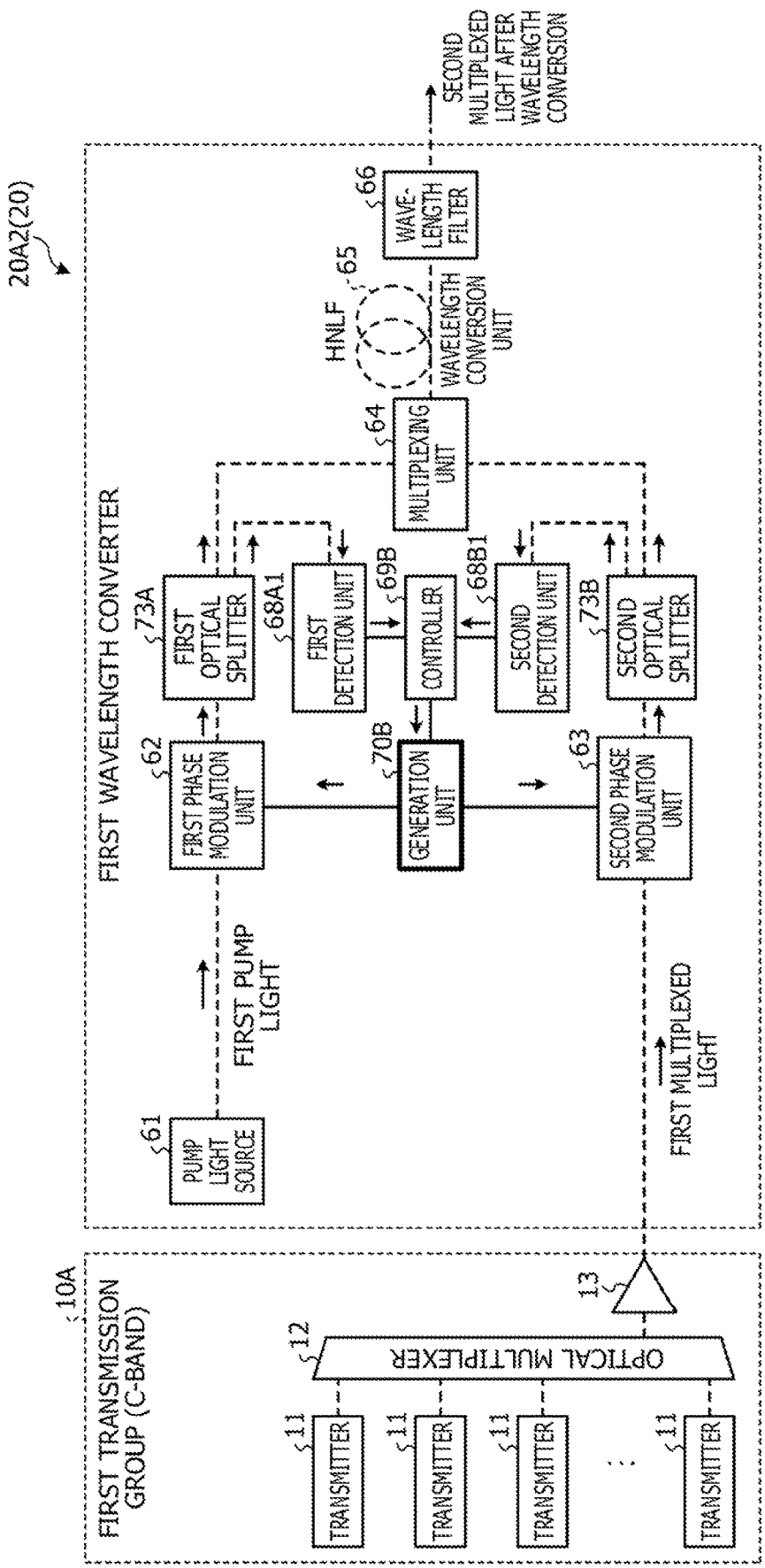
FIG. 12 illustrates an example of the wavelength converter according to a third embodiment.

FIG. 12 illustrates an example of a first wavelength converter 20A2 according to a third embodiment. The same elements as those of the first wavelength converter 20A1 according to the second embodiment are denoted by the same reference signs, thereby omitting the redundant description of the elements and operation thereof. The difference between the first wavelength converter 20A1 Illustrated in FIG. 9 and the first wavelength converter 20A2 Illustrated in FIG. 12 is that, in the first wavelength converter 20A2, the first optical SW 71 and the second optical SW 72 are removed, and the modulation component of the first pump light having undergone the phase modulation performed by the first phase modulation unit 62 is compared with the modulation component of the first multiplexed light having undergone the phase modulation performed by the second phase modulation unit 63.

The first phase modulation unit 62 receives the first pump light from the pump light source 61 and performs phase modulation on the first pump light having been input thereto. The first phase modulation unit 62 outputs the first pump light having undergone the phase modulation to the first optical splitter 73A. A first detection unit 68A1 detects the first modulation component of the first pump light having undergone the phase modulation.

The second phase modulation unit 63 receives the first multiplexed light from the optical amplifier 13 and performs phase modulation on the first multiplexed light having been input thereto. The second phase modulation unit 63 outputs the first multiplexed light having undergone the phase modulation to the second optical splitter 73B. A second detection unit 68B1 detects a third modulation component of the first multiplexed light having undergone the phase modulation.

The controller 69B compares the first modulation component from the first detection unit 68A1 with the third modulation component from the second detection unit 68B1, generates the control signal with which the difference between the modulation components is minimized, and outputs the generated control signal to a generation unit 70B. The generation unit 70B generates the first phase modulation signal and the second phase modulation signal in accordance with the control signal and inputs the first phase modulation signal and the second phase modulation signal to the first phase modulation unit 62 and the second phase modulation unit 63, respectively.

The second phase modulation unit 63 performs phase modulation on the first multiplexed light in accordance with the second phase modulation signal and outputs the first multiplexed light having undergone the phase modulation to the multiplexing unit 64 through the second optical splitter 73B. The first phase modulation unit 62 performs phase modulation on the first pump light in accordance with the first phase modulation signal and outputs the first pump light having undergone the phase modulation to the multiplexing unit 64 through the first optical splitter 73A. The multiplexing unit 64 multiplexes the first pump light having undergone the phase modulation performed by the first phase modulation unit 62 and the first multiplexed light having undergone the phase modulation performed by the second phase modulation unit 63 and outputs the first multiplexed light and the first pump light having been multiplexed to the wavelength conversion unit 65. The wavelength conversion unit 65 performs wavelength conversion on the first multiplexed light so as to obtain the second multiplexed light in accordance with the first pump light and outputs the second multiplexed light after the wavelength conversion to the wavelength filter 66. As a result, the first wavelength converter 20A2 may output the second multiplexed light with the SBS suppressed.

In the first wavelength converter 20A2 according to the third embodiment, the first modulation component is detected from the first pump light having undergone the phase modulation performed by the first phase modulation unit 62, and the third modulation component is detected from the first multiplexed light having undergone the phase modulation performed by the second phase modulation unit 63. The first wavelength converter 20A2 generates the first phase modulation signal and the second phase modulation signal so as to minimize the difference between the first modulation component and the third modulation component. As a result, since the modulation component from the second multiplexed light is minimized, the first wavelength converter 20A2 may suppress degradation in signal characteristic of the second multiplexed light.

The first wavelength converter 20A2 generates the first phase modulation signal and the second phase modulation signal so as to minimize the difference in phase timing between the first modulation component and the third modulation component and the difference in degree of modulation between the first modulation component and the third modulation component. As a result, in the first wavelength converter 20A2, the modulation component of the signal light and the modulation component of the pump light cancel out each other, and the difference in phase timing between the modulation component of the signal light and the modulation component of the pump light and the difference in degree of modulation between the modulation component of the signal light and the modulation component of the pump light are minimized. Thus, degradation in signal characteristic of the second multiplexed light may be suppressed.

Although the first wavelength converter 20A2 according to the third embodiment exemplifies the case where the wavelength conversion is performed on the first multiplexed light so as to obtain the second multiplexed light, this is not limiting. This may be appropriately changed. For example, this is also applicable to the second wavelength converter 20B, the third wavelength converter 20C, and the fourth wavelength converter 20D.

The wavelength converter 20 according to the first embodiment exemplifies the case where the modulation component is detected from the second multiplexed light after the wavelength conversion in the wavelength conversion unit 65. However, before the start of the operation, the modulation component of the first multiplexed light from the first transmission group 10A may be compared with the modulation component of local light from a local light source. An embodiment for this is described below as a fourth embodiment.

Fourth Embodiment

Figure 13:
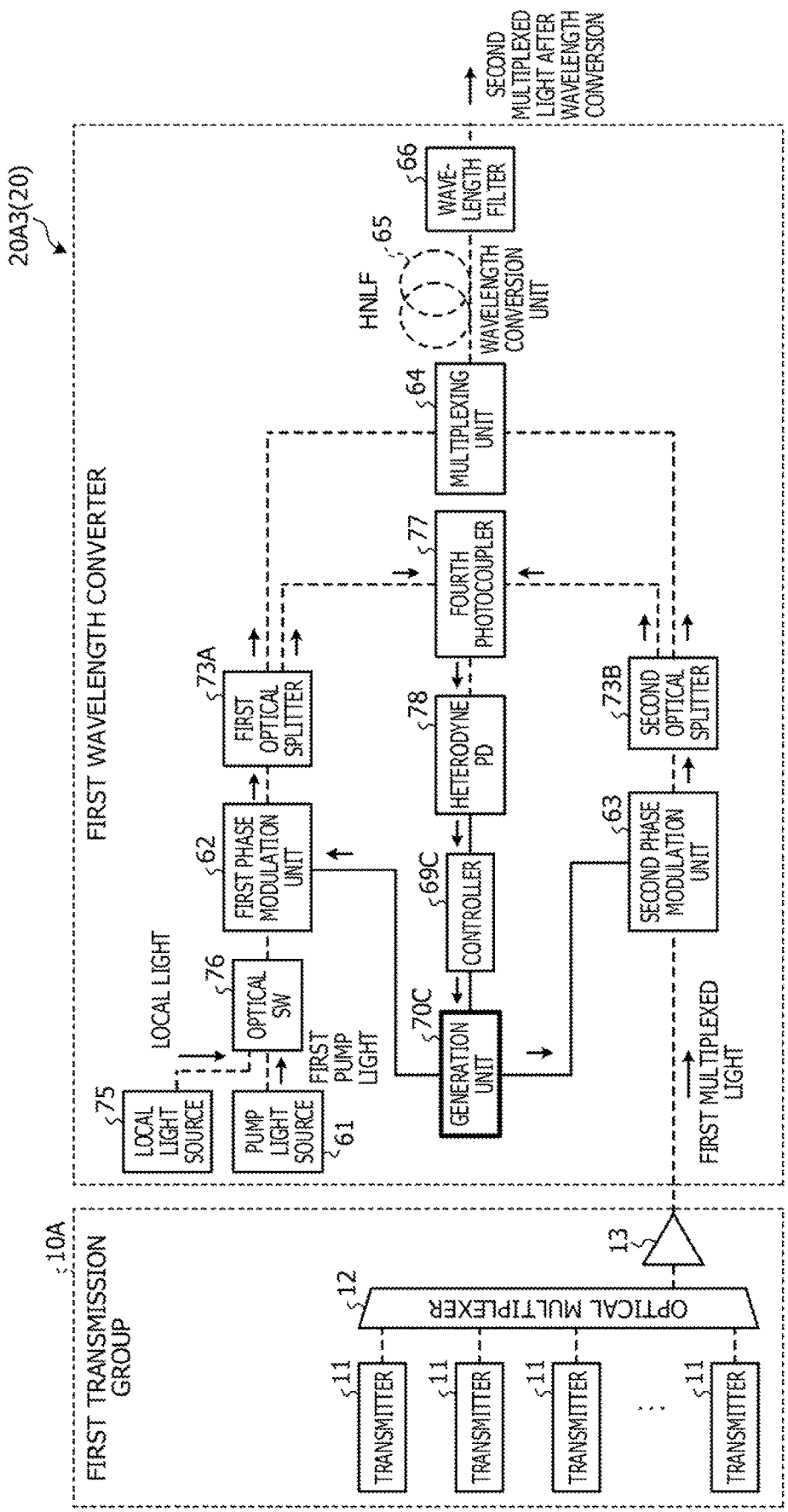
FIG. 13 illustrates an example of the wavelength converter according to a fourth embodiment.

FIG. 13 illustrates an example of a first wavelength converter 20A3 according to a fourth embodiment. The same elements as those of the first wavelength converter 20A2 according to the third embodiment are denoted by the same reference signs, thereby omitting the redundant description of the elements and operation thereof. The first wavelength converter 20A3 Illustrated in FIG. 13 includes the pump light source 61, the first phase modulation unit 62, the second phase modulation unit 63, the first optical splitter 73A, the second optical splitter 73B, the multiplexing unit 64, the wavelength conversion unit 65, and the wavelength filter 66. In addition, the first wavelength converter 20A3 includes a local light source 75, an optical SW 76, a fourth photocoupler 77, a heterodyne PD 78, a controller 69C, and a generation unit 70C.

The local light source 75 is used before the start of the operation, generates local light, and outputs the generated local light to the optical SW 76. For example, when the local light is coupled to the first transmission group 10A, the local light is signal light of an arbitrary wavelength within the wavelength range of the first multiplexed light output from the first transmission group 10A.

The optical SW 76 outputs the first pump light from the pump light source 61 or the local light from the local light source 75 to the first phase modulation unit 62. Before the start of operation, the optical SW 76 performs switching to output the local light from the local light source 75 to the first phase modulation unit 62, and, after the start of the operation, the optical SW 76 performs switching to output the first pump light from the pump light source 61 to the first phase modulation unit 62. Before the start of the operation, the first phase modulation unit 62 performs phase modulation on the local light in accordance with the first phase modulation signal and outputs the local light having undergone the phase modulation to the first optical splitter 73A. Before the start of the operation, the second phase modulation unit 63 performs phase modulation on the first multiplexed light in accordance with the second phase modulation signal and outputs the first multiplexed light having undergone the phase modulation to the second optical splitter 73B.

The fourth photocoupler 77 multiplexes the local light from the first optical splitter 73A having undergone the phase modulation performed by the first phase modulation unit 62 with the signal light from the second optical splitter 73B having undergone the phase modulation performed by the second phase modulation unit 63 and outputs the multiplexed light having undergone the phase modulation to the heterodyne PD 78. The heterodyne PD 78 detects a difference frequency component caused by the multiplexed light having undergone the phase modulation and outputs the difference frequency component to the controller 69C. Based on the difference frequency component, the controller 69C outputs to the generation unit 70C a control signal for generating the first phase modulation signal and the second phase modulation signal so as to minimize the modulation component of the local light and the modulation component of the signal light.

The generation unit 70C generates the first phase modulation signal and the second phase modulation signal in accordance with the control signal and inputs the first phase modulation signal and the second phase modulation signal to the first phase modulation unit 62 and the second phase modulation unit 63, respectively. After the start of the operation, the controller 69C switches the input of the optical SW 76 from the local light source 75 to the pump light source 61 and outputs the first pump light after the switching to the first phase modulation unit 62.

The first phase modulation unit 62 performs phase modulation on the first pump light in accordance with the first phase modulation signal and outputs the first pump light having undergone the phase modulation to the multiplexing unit 64 through the first optical splitter 73A. The second phase modulation unit 63 performs phase modulation on the first multiplexed light in accordance with the second phase modulation signal and outputs the first multiplexed light having undergone the phase modulation to the multiplexing unit 64 through the second optical splitter 73B. The multiplexing unit 64 multiplexes the first pump light having undergone the phase modulation performed by the first phase modulation unit 62 and the first multiplexed light having undergone the phase modulation performed by the second phase modulation unit 63 and outputs the first multiplexed light and the first pump light having been multiplexed to the wavelength conversion unit 65. The wavelength conversion unit 65 performs wavelength conversion on the first multiplexed light so as to obtain the second multiplexed light in accordance with the first pump light and outputs the second multiplexed light after the wavelength conversion to the wavelength filter 66. As a result, the first wavelength converter 20A3 may output the second multiplexed light with the SBS suppressed.

In the first wavelength converter 20A3 according to the fourth embodiment, before the start of the operation, switching is performed to input the local light to the first phase modulation unit 62. The local light having undergone the phase modulation performed by the first phase modulation unit 62 where the local light is input by switching is multiplexed with the signal light having undergone the phase modulation performed by the second phase modulation unit 63, thereby the difference frequency component is detected. The first wavelength converter 20A3 generates the first phase modulation signal and the second phase modulation signal so as to minimize the difference frequency component. As a result, since the modulation component from the second multiplexed light is minimized, the first wavelength converter 20A3 may suppress degradation in signal characteristic of the second multiplexed light after the start of the operation.

The first wavelength converter 20A3 generates the first phase modulation signal and the second phase modulation signal so as to minimize the difference in phase timing between the modulation component of the pump light and the modulation component of the signal light and the difference in degree of modulation between the modulation component of the pump light and the modulation component of the signal light. As a result, after the start of the operation, in the first wavelength converter 20A3, the modulation component of the signal light and the modulation component of the pump light cancel out each other, and the difference in phase timing and the difference in degree of modulation between the modulation component of the pump light having undergone the phase modulation and the modulation component of the signal light having undergone the phase modulation are minimized. Thus, degradation in signal characteristic of the second multiplexed light may be suppressed.

In the above-described embodiments, for example, the wavelength converter 20 that performs wavelength conversion on multiplexed light of the C-band so as to obtain multiplexed light of the L-band is exemplified. However, the type of light converted by the present embodiment is not limited to multiplexed light. The present embodiment may be applied to a wavelength converter that performs wavelength conversion on signal light of the C-band so as to obtain signal light of the L-band. The present embodiment may be appropriately changed. For convenience of description, the C-band is used as a reference. However, the present embodiment may be applied to a transmission system where wavelength conversion is performed on the S-band so as to obtain the L-band or on the L-band so as to obtain the S-band. The present embodiment may be appropriately changed.

In the WDM system 1 according to the above-described embodiments, the pump light used for the wavelength converter 20 may be used for an optical component such as an optical amplifier and may be appropriately changed.

The wavelength converter 20 converts the multiplexed light into an arbitrary wavelength band by propagating the multiplexed light and the pump light through a non-linear fiber, and the pump light of FM modulation (or PM modulation) may be used.

The above-described embodiments exemplify a system that uses optical components for the C-band and performs wavelength conversion on the multiplexed light of the C-band so as to obtain the multiplexed light of the S-band or L-band and transmit the obtained multiplexed light to the transmission path 3. However, the above-described embodiments are also applicable to a system that uses optical components for the S-band and performs wavelength conversion on multiplexed light of the S-band so as to obtain the multiplexed light of the C-band or L-band and transmit the obtained multiplexed light to the transmission path 3 or a system that uses optical components for the L-band and performs wavelength conversion on multiplexed light of the L-band so as to obtain the multiplexed light of the C-band or S-band and transmit the obtained multiplexed light to the transmission path 3.

Although the case of using the C-band, L-band, and S-band is exemplified according to the above-described embodiments, the bands used are not limited to the C-band, L-band, and S-band. The above-described embodiments are applicable to, for example, an original band (O-band), an extended band (E-band), and an ultralong wavelength band (U-band) and may be appropriately changed.

In the case exemplified with the wavelength converter 20, the first phase modulation signal and the second phase modulation signal are adjusted so as to generate the first phase modulation signal and the second phase modulation signal having been adjusted such that the modulation component of the signal light after the wavelength conversion is minimized. Adjustment by which the modulation components in phase with each other or in opposite phase to each other cancel out each other may be made so as to minimize the modulation component after the wavelength conversion. This may be appropriately changed.

The wavelength converter 20 exemplifies the case where wavelength conversion is performed using single-wavelength excitation light. However, the excitation right used is not limited to the single-wavelength excitation light. Wavelength conversion may be performed using two-wavelength excitation light.

The elements of the components illustrated are not necessarily physically configured as Illustrated in the drawings. For example, an exemplary form of separation and Integration of each component is not limited to the form illustrated in the drawings, and all or part thereof may be configured by being separated or integrated functionally or physically in any units depending on various loads, usage situations, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength converter apparatus comprising:
   a first phase modulator configured to perform phase modulation on pump light in accordance with a first phase modulation signal;
   a second phase modulator configured to perform phase modulation on signal light in accordance with a second phase modulation signal;
   a wavelength converter configured to multiplex the signal light having undergone the phase modulation with the pump light having undergone the phase modulation, the wavelength converter configured to perform wavelength conversion on the signal light in accordance with the pump light;
   a detector configured to detect a modulation component from the signal light having undergone the phase modulation and the pump light having undergone the phase modulation; and
   a generator configured to generate the first phase modulation signal and the second phase modulation signal so as to minimize the detected modulation component, and adjust a first delay amount of the first phase modulation signal and a second delay amount of the second phase modulation signal according to the detected modulation component.

2. The wavelength converter apparatus according to claim 1, wherein
   the detector is disposed at a stage subsequent to the wavelength converter and detects the modulation component from the signal light after the wavelength conversion.

3. The wavelength converter apparatus according to claim 1, further comprising:
   a switch that inputs the signal light or part of the pump light to the second phase modulator by switching the input to the second phase modulator between the signal light and the part of the pump light, wherein
   the detector includes
   a first detector that is disposed between the first phase modulator and the wavelength converter and that detects a first modulation component of the pump light from the modulation component, and
   a second detector that is disposed between the second phase modulator and the wavelength converter and that detects a second modulation component of the pump light from the second phase modulator to which the pump light to which the input of the switch is switched is input, and wherein
   the generator generates the first phase modulation signal and the second phase modulation signal so as to minimize a difference between the first modulation component and the second modulation component.

4. The wavelength converter apparatus according to claim 1, wherein
   the detector includes
   a first detector that is disposed between the first phase modulator and the wavelength converter and that detects a first modulation component of the pump light from the modulation component, and
   a second detector that is disposed between the second phase modulator and the wavelength converter and that detects a second modulation component of the signal light from the modulation component, and wherein
   the generator generates the first phase modulation signal and the second phase modulation signal so as to minimize a difference between the first modulation component and the second modulation component.

5. The wavelength converter apparatus according to claim 1, further comprising:
   a switch that inputs local light identical to the signal light or part of the pump light to the first phase modulator by switching the input to the first phase modulator between the local light and the part of the pump light, wherein the detector includes
   a third detector that multiplexes, so as to detect a difference frequency component, the local light which is input to the first phase modulator by switching performed by the switch and which has undergone the phase modulation performed by the first phase modulator with the signal light having undergone the phase modulation performed by the second phase modulator, and wherein
   the generator
   generates the first phase modulation signal and the second phase modulation signal so as to minimize the difference frequency component.

6. The wavelength converter apparatus according to claim 1, wherein
   the generator generates the first phase modulation signal and the second phase modulation signal so as to minimize a difference in degree of modulation between the signal light having undergone the phase modulation and the pump light having undergone the phase modulation and minimize a difference in phase timing between the signal light having undergone the phase modulation and the pump light having undergone the phase modulation.

7. A method of performing wavelength conversion, the method comprising:

performing phase modulation on pump light in accordance with a first phase modulation signal;

performing phase modulation on signal light in accordance with a second phase modulation signal;

multiplexing the signal light having undergone the phase modulation with the pump light having undergone the phase modulation and performing wavelength conversion on the signal light in accordance with the pump light;

detecting a modulation component from the signal light having undergone the phase modulation and the pump light having undergone the phase modulation;

generating the first phase modulation signal and the second phase modulation signal so as to minimize the detected modulation component; and adjusting a first delay amount of the first phase modulation signal and a second delay amount of the second phase modulation signal according to the detected modulation component.

8. The method according to claim 7, wherein
the detecting the modulation component detects the modulation component from the signal light after the wavelength conversion.

9. The method according to claim 7, wherein
the detecting the modulation component includes
detecting a first modulation component of the pump light from the modulation component, and
detecting a second modulation component of the signal light from the modulation component, and wherein
the generating generates the first phase modulation signal and the second phase modulation signal so as to minimize a difference between the first modulation component and the second modulation component.

* * * * *